Oct. 6, 1970  SHOZO OMORI  3,531,905
PROCESS FOR FORMING PACKAGING BOXES AND SIMULTANEOUSLY
PACKING ARTICLES THEREIN AND APPARATUS THEREFOR
Filed Dec. 27, 1968  10 Sheets-Sheet 1

INVENTOR
SHOZO OMORI
BY
ATTORNEY

Oct. 6, 1970  SHOZO OMORI  3,531,905
PROCESS FOR FORMING PACKAGING BOXES AND SIMULTANEOUSLY
PACKING ARTICLES THEREIN AND APPARATUS THEREFOR
Filed Dec. 27, 1968                                10 Sheets-Sheet 10

INVENTOR
SHOZO OMORI
BY
ATTORNEY

United States Patent Office 3,531,905
Patented Oct. 6, 1970

3,531,905
PROCESS FOR FORMING PACKAGING BOXES AND SIMULTANEOUSLY PACKING ARTICLES THEREIN AND APPARATUS THEREFOR
Shozo Omori, 7–4 Negishi 5-chome, Taito-ku, Tokyo, Japan
Filed Dec. 27, 1968, Ser. No. 787,328
Claims priority, application Japan, Dec. 29, 1967, 43/85,261; Dec. 31, 1967, 43/85,279
Int. Cl. B65b 11/22, 19/34, 35/30
U.S. Cl. 53—26                                      36 Claims

ABSTRACT OF THE DISCLOSURE

Process for automatically and successively forming packaging boxes from blanks thereof and packing a predetermined number of articles therein simultaneously with the formation of each of the packaging boxes and the apparatus for carrying out the above described process. The articles are fed on a conveyer in a row lengthwise thereof, and a predetermined fraction of the predetermined number of the articles to be packed in each of the packaging boxes is repeatedly shifted transverse to the direction of the feeding of the articles from the foremost portion of the row as the articles are fed on the conveyer. Each of the predetermined fractions of the predetermined number of the articles thus successively shifted transverse to the direction of the feeding from the conveyer is stacked on a supporting table by lowering it stepwise correspondingly to the stacked height of the articles until the predetermined number of the articles are stacked on the supporting table. The thus stacked articles are shifted together into a packaging box forming means adapted to form successively packaging boxes from the blanks thereof each time the respective packaging boxes are formed so that the predetermined number of the articles are packed in each of the packaging boxes simultaneously with the formation thereof. The packaging box forming means is comprised of an open ended female packaging box forming die through which a supporting table is reciprocally movable and a hollow male packaging box forming die also movable through the female die together with the supporting table with the blank fed on the supporting table being clamped between the male die and the supporting table while the articles are held in the hollow space of the male die on the blank supported on the female die. Thus, when a packaging box is formed by means of the male and female dies, the articles are packed therein simultaneously.

BACKGROUND OF THE INVENTION

The present invention relates to a novel and useful process for automatically and successively forming packaging boxes and packing therein a predetermined number of articles therein simultaneously with the formation of each of the packaging boxes and the apparatus therefor.

Heretofore, an apparatus was well-known by which a plurality of articles such as sausages are packed automatically in each of a plurality of preliminarily completed packaging boxes successively.

Further, an apparatus was well-known by which a plurality of packaging boxes are successively formed from a plurality of blanks thereof.

However, the construction of these apparatuses is very complicated and large space is required to arrange such apparatuses to produce the packaging boxes with the articles packed therein and the production efficiency is lowered.

The present invention aims at avoiding the above disadvantages.

SUMMARY OF THE INVENTION

An object of the present invention is to provide a novel and useful process for automatically and successively forming packaging boxes from the blanks thereof and packing therein a predetermined number of articles simultaneously with the formation of each of the packaging boxes and the apparatus therefor.

Another object of the present invention is to provide a novel and useful process for achieving the above object and the apparatus therefor wherein the predetermined number of the articles packed in the packaging box can be varied.

Further object of the present invention is to provide a novel and useful apparatus of the type described above which is compact in size and simple in construction while high efficiency of production of the packaging boxes with the articles packed therein is obtained.

The above objects of the present invention is achieved in accordance with the present invention by providing a process comprising the steps of feeding the articles by means of a conveyer with the articles arranged thereon in a row in the direction of the feeding thereof by the conveyer, shifting a predetermined fraction of the above predetermined number of the articles located foremost of the row out of the conveyer in the direction transverse to that of the feeding thereof by the conveyer to a predetermined position after temporarily stopping the feeding of the articles, repeatedly shifting the respective successive fractions of the predetermined number of the articles to the predetermined position as they are advanced by the conveyer and temporarily stopped while stepwise lowering successively each of the preceding fractions of the predetermined number of the articles shifted to the predetermined position in timed relation to the shifting of the articles by such a distance that each of the succeeding fractions of the predetermined number of the articles is stacked on the uppermost fraction of the precedingly stacked fractions of the articles until the predetermined number of the articles are stacked at the predetermined position, shifting the predetermined number of the articles stacked at the predetermined position together to packaging box forming means thereby permitting the predetermined number of the articles to be packed in a packaging box while it is formed in the packaging box forming means from a blank of the packaging box, the above described steps being repeated in a cyclic manner so that the automatic formation of the packaging boxes and the simultaneous packing of the predetermined number of the articles in each of the packaging boxes are effected successively.

In accordance with another feature of the present invention, the process of the present invention is characterized by the steps of locating the predetermined number of the articles in stacked relation at a predetermined position, feeding a blank of the packaging box onto a supporting table movably located in an open ended female packaging box forming die adjacent to the predetermined position when the supporting table is located flush with the edges of the female packaging box forming die with the blank being registered with respect thereto, shifting the predetermined number of the articles located at the predetermined position onto the blank located on the supporting table, lowering a hollow male packaging box forming die into the female packaging box forming die and beyond the open end thereof while the supporting table is lowered together with the descending male packaging box forming die with the predetermined number of the articles being located in the male packaging box forming die and with the blank located on the supporting table being clamped between the male packaging box forming die and the supporting table along the side edges of the bottom of the packaging box to be formed from the blank thereby permitting the side walls of the packaging box to be formed from the blank around the male packaging box forming die by the cooperation of the male and female packaging box forming dies, returning the male packaging box forming die through the female packaging box forming die to its initial position while the supporting table is kept stationary with the thus formed packaging box packing therein the predetermined number of the articles being supported thereon, removing the formed packaging box from the supporting table, and raising the supporting table to its initial position, the above described steps being repeated in a cyclic manner so that the automatic formation of the packaging boxes and the simultaneous packing of said predetermined number of the articles in each of the packaging boxes are effected successively.

The apparatus for carrying out the above described objects is characterized by conveyer means for feeding the articles with the articles arranged thereon in a row in the direction of the feeding thereof by the conveyer means, means for temporarily stopping the feeding of the articles on the conveyer means, first pusher means for repeatedly shifting a predetermined fraction of the predetermined number of the articles located foremost of the row in the direction transverse to that of the feeding of the articles by the conveyer means onto a supporting table in timed relation to the temporary stopping of the feeding of the articles each time after the articles are advanced by the conveyer means, means for stepwise lowering the supporting table in timed relation after the predetermined fraction of the predetermined number of the articles has been shifted onto the supporting table by such a distance that the succeeding fraction of the predetermined number of the articles is stacked on the uppermost fraction of the precedingly stacked fractions of the predetermined number of the articles on the supporting table until the predetermined number of the articles is stacked on the supporting table and returning the same to its initial position, second pusher means for shifting the predetermined number of the articles stacked on the supporting table into packaging box forming means after the predetermined number of the articles has been stacked on the supporting table, the packaging box forming means being adapted to form successively packaging boxes from the blanks thereof in times relation to the shifting of the predetermined number of the articles into the packaging box forming means, thereby permitting the automatic formation of the packaging boxes and the simultaneous packing of said predetermined number of the articles in each of the packaging boxes to be effected successively.

In accordance with further feature of the present invention the apparatus for carrying out the above objects is characterized by means for feeding and positioning successively blanks of the packaging boxes onto a supporting table located in an open ended female packaging box forming die and movable therein from a first position flush with the edges of the female packaging box forming die therethrough to a second position beyond the open end of the female packaging box forming die and reversely to its first position, the blank being fed on the supporting table when the same is positioned at the first position, a hollow male packaging box forming die adapted to move through the female packaging box forming die in fitting relation therewith from a first position above the female packaging box forming die to a second position beyond the open end of the female packaging box forming die, first pusher means for shifting the predetermined number of the articles onto the blank located on the supporting table in timed relation to the feeding and positioning of the blank on the supporting table, first driving means for repeatedly moving the supporting table from its first position to the second position each time after the blank and the predetermined number of the articles are loaded thereon and returning the supporting table to the first position second driving means for repeatedly moving the male packaging box forming die from its first position to its second position in contact with the supporting table when the latter is moved from its first position to its second position so that the blank on the supporting table is clamped between the male packaging box forming die and the supporting table along the side edges of the bottom of the packaging box to be formed from the blank and the predetermined number of the articles is located within the male packaging box forming die thereby permitting the side walls of the packaging box to be formed around the male packaging box forming die from the blank by the cooperation of the male and female packaging box forming dies during the movement of the male packaging box forming die from its first position to its second position, the male packaging box forming die being returned to its first position by the second driving means while the supporting table is kept stationary at its second position with the predetermined number of the articles being packed in the thus formed packaging box located on the supporting table, and second pusher means for shifting the formed packaging box out of the supporting table, the supporting table being returned to its first position by the first driving means after the formed packaging box is shifted by the second pusher means from the supporting table.

As described above, a novel and useful process and apparatus for automatically and successively forming packaging boxes and packing therein a predetermined number of articles simultaneously with the formation of each of the packing boxes is provided by the present invention.

The process and apparatus of the present invention are very efficient in operation and require little space thereby giving advantages.

DETAILED DESCRIPTION OF THE PREFERRED EMBODIMENTS

Figure 1:
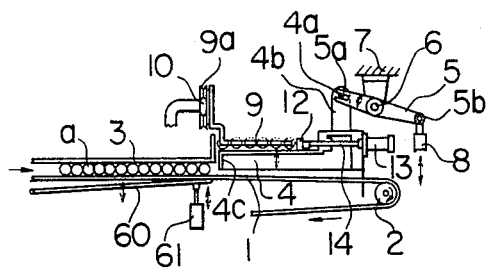
FIG. 1 is a schematic view showing the principle of the first embodiment of the present invention.
Figure 2:
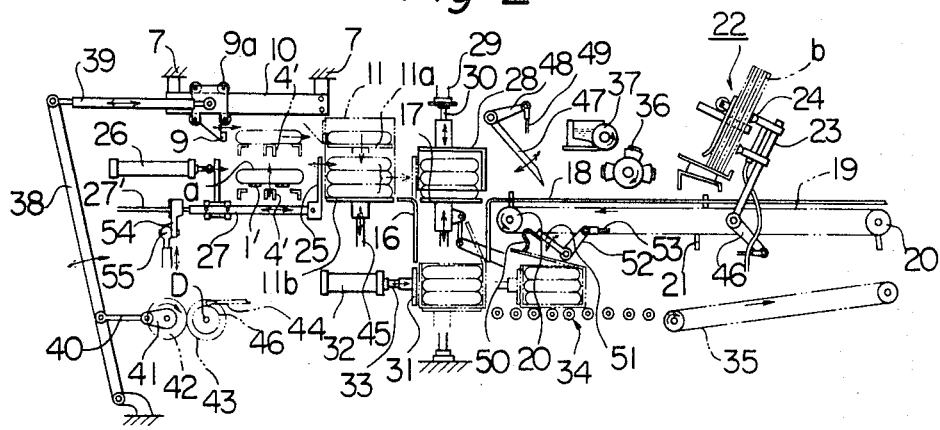
FIG. 2 is a schematic view of FIG. 1 as seen in the direction normal to that in which the first embodiment is seen in FIG. 1.

FIGS. 1 and 2 show the principle of the operation of the first embodiment of the present invention.

A plurality of articles $a$ such as sausages are fed in a row in the direction indicated by the arrow by means of conveyer means 1 comprised of two belts 1', in this example, which are spaced in parallel to each other and driven around rollers one of which is indicated at 2. Guide plate 3 is arranged above the conveyer means 1 for guiding the articles $a$ thereon. A lifting means 4 is provided at the forward end portion of the conveyer means 1. The lifting means 4 is in the form of a fork having three arms 4', in this example, which are spaced in parallel to each other so that the arms 4' are moved vertically through the belts 1' from the position thereof indicated by solid line in FIG. 2 to the position indicated by the chain line. The lifting means 4 is guided in guide means (not shown) provided in the apparatus so as to reciprocally move vertically. In order to drive the lifting means 4, a swingable lever 5 is provided which is pivoted at 6 to the machine frame 7. The bifurcation 5a at one end of the lever 5 engages with a pin 4a secured to an arm 4b provided on the lifting means 4. The other end 5b of the lever 5 is pivotally connected to one end of a rod 8 which is reciprocally moved from a driving shaft D (FIG. 2) in the apparatus through lever means reciprocally swung by cam means on the driving shaft D or crank means (not shown) well known in the art, so that the lifting means 4 is reciprocally moved vertically by means of the lever 5. As shown, when the lifting means 4 is lifted above the belts 1', a predetermined number of articles $a$ on the conveyer means 1 are lifted thereby to the position shown by the chain line in FIG. 2. A pusher means 9 is guided horizontally by means of a horizontal rail 10 secured at its both ends to the machine frame 7, rollers 9a being rotatably provided in the pusher means 9 which engage with the rail 10 so as to move the pusher means 9 along the rail 10. The path of travel of the pusher means 9 is set that the articles $a$ lifted by the lifting means 4 to the position shown by the chain line in FIGS. 1 and 2 are shifted transverse to the direction of the feeding of the articles $a$ by the conveyer means 1 to a position between a pair of spaced parallel stationary walls 11 provided as shown in FIG. 2.

Stopper means 12 is provided in the lifting means 4 adjacent to the forward end thereof. The articles $a$ advanced by the conveyer means 1 are temporarily stopped by the stopper means 12. The position of the stopper means 12 is adjustable by a cylinder 13 secured to the forward end of the lifting means 4 and a piston (not shown) movable in the cylinder 13 and connected to the stopper means 12 through a piston rod 14. The operation of the cylinder 13 and the piston is conventional and, hence, not described in detail. By adjusting the position of the stopper means 12 with respect to the lifting means 4, the number of articles $a$ to be lifted by the lifting means 4 at one time can be varied.

Further stopper means 4c is provided at the rearward end of the lifting means 4 which is adapted to stop the feeding of the succeeding articles $a$ on the conveyer means 1 when the lifting means 4 is in the lifted position as shown in FIG. 1.

A supporting table 15 is vertically movably located in the position 11. The supporting table 15 is adapted to be moved stepwise downwardly in timed relation to the shifting of the articles $a$ by means of the pusher means 9 from the uppermost level 11a flush with the lifted position of the lifting means 4 to the lowermost level 11b by such a distance that the succeeding articles $a$ on the lifting means 4 are shifted by the pusher means 9 when the lifting means 4 is in lifted position and stacked on the uppermost articles $a$ already stacked on the supporting table 15. Thus, the articles $a$ can be successively stacked on the supporting table 15 each time the articles $a$ are shifted by the pusher means 9 from the lifting means 4 to the position 11 at the level 11a while the supporting table 15 is stepwise lowered by the distance described above. Thus, a predetermined number of articles $a$ can be stacked on the supporting table 15 until it reaches the lowermost level 11b.

An open ended female packaging box forming die 16 is provided adjacent to the supporting table 15 and the level of the edges of the die 16 is flush with the level 11b. A second supporting table 17 is vertically movable in the die 16 from a first position flush with the edges of the die 16 downwardly to a second position beyond the open end of the die 16.

Guide table 18 is connected to one of the edges of the die 16 and one or more feeding chains 19 are driven around sprockets or wheels 20 beneath the guide table 18 as shown. A plurality of pusher blades 21 are connected to the chains 19 at equal distance from each other. The blades 21 in the upper stretch of the chain 19 project through the slot formed in the guide table 18.

Blank supply means 22 is provided above the guide table 18 and adapted to successively supply each of the blanks $b$ of the packaging boxes onto the guide table 18.

In the embodiment shown, the blank supply means 22 is provided with swingable lever 23 provided with suction heads 24 connected to an exterior vacuum source (not shown). Therefore, each of the blanks $b$ is removed from the blank supply means 22 and fed on the guide table 18 each time the swingable lever 23 is swung by the driving shaft through means described later. The blank $b$ fed onto the guide table 18 is fed toward the female die 16 by means of one of the pusher blades 21 of the chain 19 and located on the supporting table 17 in predetermined position.

Pusher means 25 is connected to a cylinder 26 through a rod 27 and the pusher means 25 is actuated by the cylinder 26 to shift the stacked articles $a$ on the supporting table 15 onto the blank $b$ located on the supporting table 17 each time the blank $b$ is located thereon.

A hollow male packaging box forming die 28 is vertically movably provided in alignment with the female packaging box forming die 16. This male die 28 is driven by a cylinder 29 through a rod 30 so that the male die 28 is reciprocally moved from a first position above the supporting table 17 through the female die 16 to a second position beyond the open end of the female die 16.

After the articles $a$ are located on the blank $b$ on the supporting table 17, the supporting table 17 is lowered to its second position and, at the same time, the male die 28 is lowered so that it abuts against the supporting table 17 with the blank $b$ sandwiched therebetween and the articles $a$ located in the male die 28. Thus, the side walls of the packaging box is formed from the blank $b$ as it is lowered together with the die 28 and the supporting table 17 through the female die 16 by the cooperation of the male and female dies 28 and 16, while the articles $a$ located on the blank $b$ are packed simultaneously in the formed packaging box.

After the supporting table 17 reaches its second position together with the male die 28 abutting thereagainst with the formed packaging box held therebetween, the male die 28 is returned to its first position while the formed packaging box and the supporting table 17 are left at their lowered positions.

A second pusher means 31 is reciprocally moved horizontally between the open end of the female die 16 and the supporting table 17 held at its second lowermost position by means of a cylinder 32 through a rod 33. Therefore, the formed packaging box on the supporting table 17 is shifted therefrom to conveyer means 34, 35 when the pusher means 31 is actuated by the cylinder 32.

Adhesive applying means 36 and adhesive applicator roller 37 may be provided above the guide table 18 so that the adhesive can be applied to each of the blanks $b$ each time they are fed on the guide table 18. Thus, the adhesive applied to the blank $b$ joins the mating portions of the packaging box to be formed while it is formed in the female die 16.

Driving means for reciprocally driving the pusher means 9 consists of a lever 38 and a connecting lever 39. One end of the lever 38 is pivotally connected to the machine frame 7 while the other end thereof is pivotally connected to one end of the connecting lever 39, the other end of which is in turn pivotally connected to the pusher means 9. A further connecting rod 40 is pivotally connected at its one end to the lever 38 at intermediate portion thereof while the other end of the lever 40 is pivotally connected to a crank 41 fixed to a gear 42 which meshes with a gear 43 mounted on the driving shaft D.

The gear ratio of the gear 42 with respect to the gear 43 is appropriately selected so that desired number of reciprocal movement of the pusher means 9 is obtained during one revolution of the driving shaft D.

Therefore, the pusher means 9 is reciprocally moved by the driving shaft D through the gears 43, 42, the crank 41, the levers 40, 38 and the connecting rod 39 as the driving shaft D rotates.

The lifting means 4 is driven by the driving shaft D in timed relation to the movement of the pusher means 9 by appropriately selecting the contour of the cam means or the rotation ratio of the crank means relative to the driving shaft, so that the articles $a$ are lifted by the lifting means 4 in timed relation to the actuation of the pusher means 9.

Similarly, the supporting table 15 is a stepwise lowered in timed relation to the actuation of the pusher means 9 by driving means consisting of a lever 44 connected at its one end to the rod 45 fixed to the supporting table 15 and stepwise swung by cam means 46 mounted on the driving shaft D and cooperating with the lever 44, the contour of the cam means being selected so that the supporting table 15 is returned to its initial position after one revolution of the driving shaft D.

Similarly, the supporting table 17 is driven by a connecting rod and a lever operatively coupled with the driving shaft D so that the supporting table 17 is actuated in timed relation to the actuation of the pusher means 25.

The timing of the operation of each of the driving means and the cylinders described above is correlated to each other so that the sequential feeding of the articles $a$ and the simultaneous formation of the packaging box are repeatedly effected.

A lever 46 connected to the lever 23 of the blank supply means 22 is operatively coupled with the driving shaft D so that the lever 23 is swung by the actuation of the lever 46 in timed relation to the actuation of the male die 28 and the supporting table 17.

Positioning lever 47 provided above the guide table 18 serves to properly position the blank $b$ fed on the supporting table 17. The lever 47 is swung by the lever 48 through connecting rod 49 which is operatively coupled to the driving shaft D through means (not shown) in timed relation to the feeding of the blank $b$ to the supporting table 17.

Since the upper edges of the formed packaging box is positioned closely beneath the open end of the female die 16 when the supporting table 17 is lowered to its second position, the lid portion of the packaging box, if such is provided, is bent to cover the packaging box by the open end of the female die 16 when the packaging box is shifted out of the supporting table 17 by means of the pusher means 31.

Pressing means 50 attached to a swingable lever 51 is provided adjacent to the female die 16 at the side from which the formed packaging box is discharged by the pusher means 31. The pressing means 50 is adapted to bend the lug of the lid portion of the packaging box against the side wall thereof so that the lug is bonded to the side wall by the adhesive previously applied to the lag by the adhesive applying means 36.

The actuation of the pressing means 50 is effected in timed relation to the actuation of the pusher means 31 by a lever 52 connected to the lever 51 through a connecting rod 53 which is operatively coupled with the driving shaft D.

Since the articles $a$ are successively stacked on the supporting table 15, a pair of stationary side walls 11 are provided at either sides of the table 15 along the direction of the feeding of articles $a$ by means of the pusher means 9 in order to prevent the articles $a$ stacked on the table 15 from falling therefrom.

Figure 3:
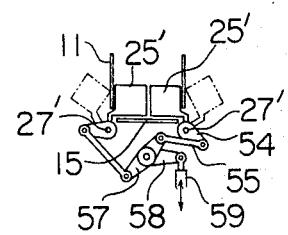
FIG. 3 is a fragmental view showing the swinging means for swinging a pair of pusher plates in the first embodiment of the present invention.

The pusher means 25 consists of a pair of symmetrically located pushed blades 25' as shown in FIG. 3. The rods 27 each mounting thereon each of the blades 25' are provided at their rearward end portion with longitudinal grooves or spline shafts 27' respectively. Each of the spline shafts 27' slidably fits with a mating hole formed in one end of a lever 54, the opposite end of which is pivotally connected to one end of a connecting rod 55. The other end of each of the connecting rods 55 is swingably connected to the respective ends of a lever 57. A lever 58 is connected to the lever 57. The lever 58 is reciprocally swung by a connecting rod 59 which is operatively coupled with the driving shaft D in such a manner that blades 25' are rotated toward each other within the space between the side walls 11 when the pusher means 25 is actuated to shift the articles $a$ on the table 15 therefrom toward the table 17 while the blades 25' are moved from each other outside of the side walls 11 when the pusher means 25 is returned to its initial position. Since, the lever 54 is slidably engaged with the spline shaft 27' of the rod 27, the pusher means 25 can be operated by the cylinder 26 without being disturbed by the engagement between the lever 54 and the rod 27'. This permits the table 15 to be returned to its first position for the next cyclic operation during the return movement of the pusher means 25 thereby obtaining higher efficiency of the apparatus.

Temporary stopping means 60 such as a swingable lever (FIG. 1) is provided beneath the conveyer 1 with the free end thereof located adjacent to the lifting means 4 as shown. The stopping means 60 is actuated by actuating means 61 such as a solenoid in timed relation to the actuation of the lifting means 4 so that the feeding of the articles $a$ on the conveyer 1 is temporarily stopped while the lifting means 4 is lifted thereby preventing the damage of the articles, which might otherwise advance during the time the lifting means is raised, by the descending movement of the lifting means 4.

Figure 5:
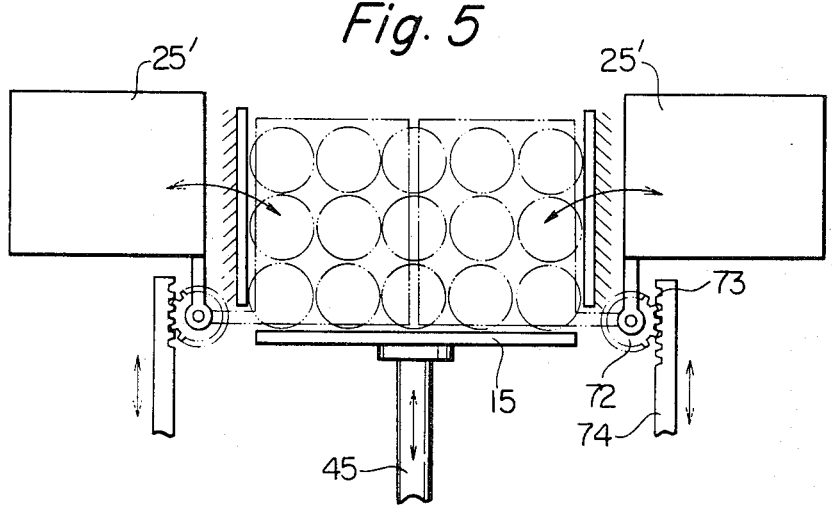
FIG. 5 is a fragmental view showing the swinging means for swinging a pair of pusher plates in the second embodiment of the present invention.
Figure 4:
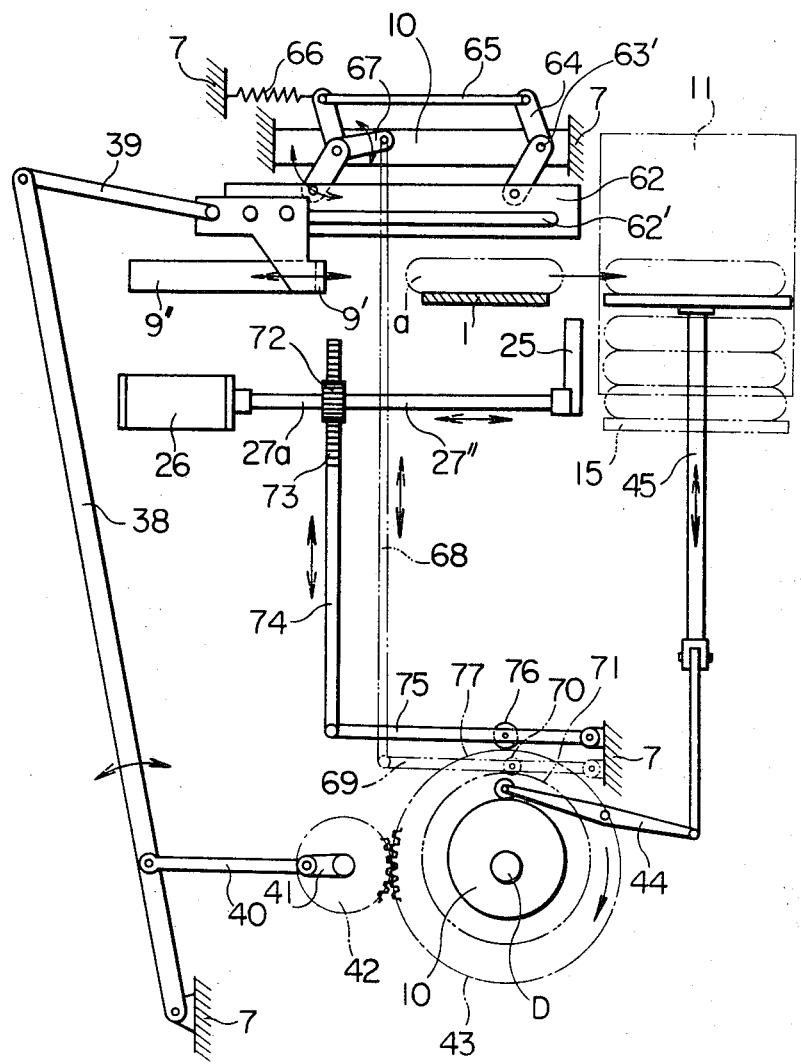
FIG. 4 is a schematic view showing the principle of the second embodiment of the present invention.

FIGS. 4 and 5 show the principle of the operation of the second embodiment of the present invention.

The apparatus in FIGS. 4 and 5 is generally similar to that of FIGS. 1 to 3 except that the lifting means is eliminated and the pusher means 9' is advanced transversely immediately above the conveyor 1 so that the articles *a* are shifted transverse to the conveyor 1 directly therefrom while the pusher means 9' is returned along a path above the conveyor 1 spaced at sufficient distance therefrom that the succeeding articles *a* on the conveyor 1 can be advanced during the return movement of the pusher means 9'.

Further, the pusher blades 25' of the pusher means 25 are actuated by means of pinion and rack means instead of link means.

In order to elevate the pusher means 9' during the return movement thereof, a futrher guide rail 62 is connected to the stationary rail 10 by means of a pair of links 63 so that the rails 10, 62 and the links 63 form a parallelogram. The pusher means 9' is guided in an elongated groove 62' in the guide rail 62.

The links 63 are pivotable about pins 63' fixed to the rail 10 so that the guide rail 62 can be moved up- and downwardly when the links 62 are swung while the horizontal position of the rail 62 is kept during the movement of the rail 62.

A lever 64 is fixedly attached to each of the links 63 so that the lever 64 is swung about the pin 63' together with the link 63. A rod 65 swingably connects the outer end of each of the levers 64.

A spring 66 is attached at its one end to the outer end of one of the levers 64 while the other end of the spring 66 is attached to a stationary portion of the machine frame 7, so that the lever 64 is normally urged so as to move the guide rail 62 downwardly.

A further lever 67 is fixedly secured to one of the links 63. The outer end of the lever 67 is pivotably connected to one end of an actuating rod 68 while the other end of the rod 68 is swingably connected to one end of an actuating lever 69 the other end of which is pivotally fixed to the machine frame 7.

A roller 70 is mounted on the lever 69 intermediate the ends thereof which is adapted to engage with a cam 71 mounted on the driving shaft D.

The contour of the cam groove in the cam 71 is so shaped that the lever 69 is actuated by the cam 71 to pull the rod 68 so as to move the guide rail 62 upwardly through the lever 67 and the link 62 against the action of the spring 66 in timed relation to the return movement of the pusher means 9' effected by the actuation of the lever 38 in the similar manner as in the case of FIGS. 1 to 3.

Thus, the pusher means 9' is lifted while it is returned to its initial position.

In the apparatus of FIGS. 4 and 5, the pusher blades 25' of the pusher means 25 are mounted on the rods 27", respectively, which are directly driven by the cylinder 26. Each of the rod 27' has a splined portion 27a intermediate the ends thereof which slidably engages with the mating splined hole of a pinion 72 rotatably held in the apparatus but the axial movement of which is limited.

Each of the pinions 72 engages with a rack 73 provided in the rod 74. The lower ends of the rods 74 are swingably connected to the outer end of an actuating lever 75, the other end of which is swingably mounted on the machine frame 7 as shown in FIG. 4. A roller 76 is mounted on the lever 75 intermediate the length thereof which engages with a cam 77 mounted on the drive shaft D. The contour of the cam 77 is so shaped that the lever 75 is actuated by the cam 77 so as to move the rods 74 up- and downwardly and, hence, to rotate the pinions 72 oppositely to each other in timed relation to the actuation of the pusher means 25 by means of the cylinder 26 so that the blades 25' are rotated toward each other to assume the positions as shown by chain line in FIG. 5 when the pusher means 25 is advanced while the pusher blades 25' are rotated from each other to assume the positions as shown by the solid line in FIG. 5 when the pusher means 25 is returned to its initial position.

As described above, the present invention provides a novel and useful automatic apparatus for forming the packaging boxes successively and simultaneously packing therein a predetermined number of articles in each of the formed packaging boxes.

FIGS. 6 to 11, 15 to 18 show an apparatus constructed in accordance with the first embodiment of the present invention.

The portions of the apparatus similar in construction and operation thereof to those in FIGS. 1 to 3 are indicated by the same reference numerals, respectively, and, therefore, the detailed description of the apparatus will be unnecessary.

Figure 6:
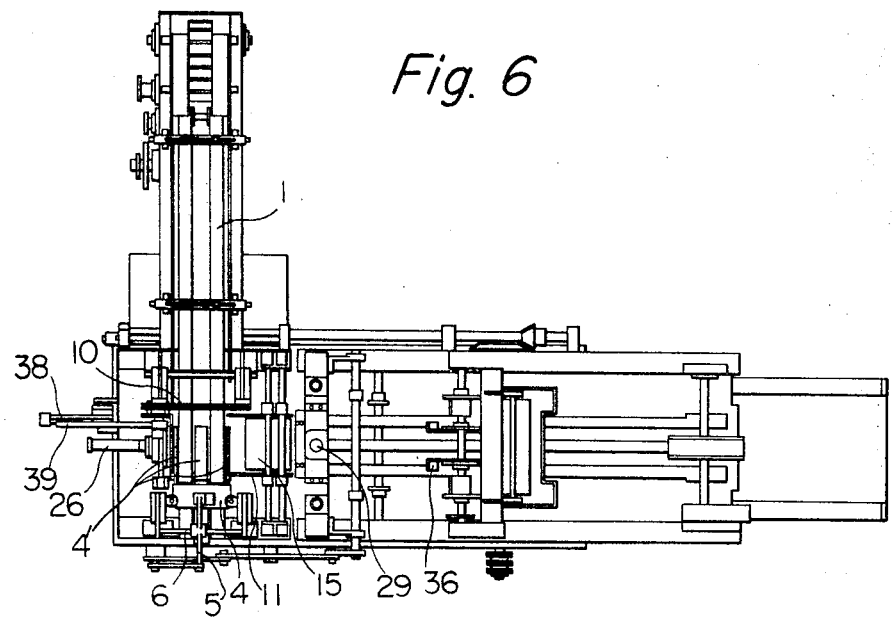
FIG. 6 is a general plan view showing the apparatus of the present invention constructed in accordance with the principle of the first embodiment thereof.
Figure 7:
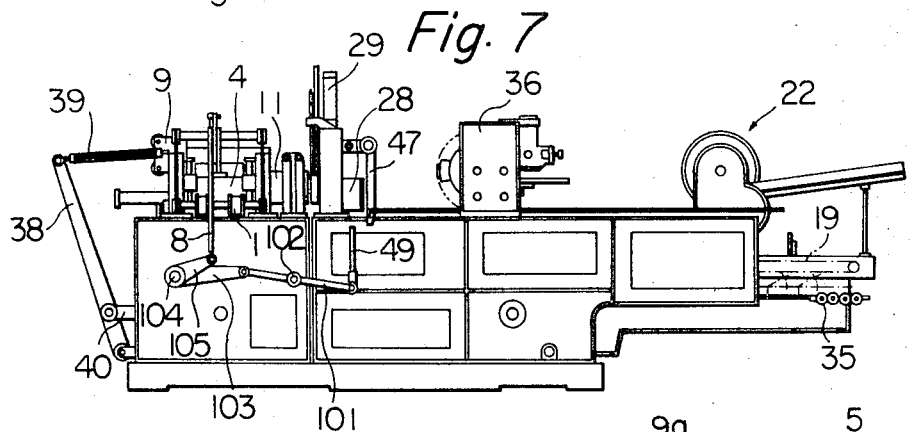
FIG. 7 is a general side view of FIG. 6.
Figure 8:
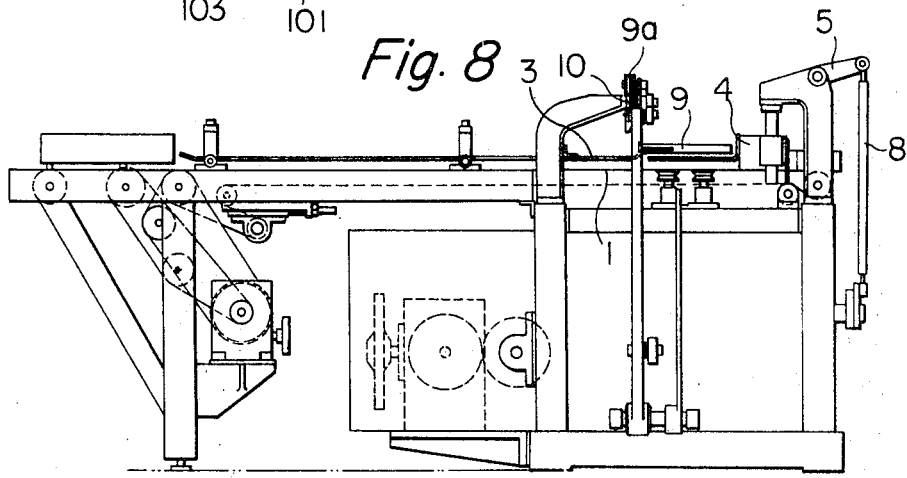
FIG. 8 is an end view showing the scheme of the lifting means and first pusher means incorporated in the apparatus of FIG. 6.

In the apparatus of FIG. 6 etc., the rod 49 for actuating the positioning lever 47 is shown as being actuated by a lever 101 pivoted at 102 with one end swingably connected to the lower end of the rod 49 and the other end thereof swingably engaged with an elongated hole formed in the outer end of a lever 103 attached to a sleeve journaled on a shaft 104, and the inner end of the sleeve mounts thereon a lever having its outer end engaged with a cam (not shown) mounted on the driving shaft D, so that the lever 103 is actuated by the cam on the driving shaft D in timed relation to the feeding of the blank *b* of the packaging box.

Similarly, the rod 8 for actuating the lifting means 4 is actuated by a lever 105 mounted on a sleeve which is journaled on the sleeve of the lever 103. A lever mounted on the inner end of the sleeve of the lever 105 is engaged with a cam mounted on the driving shaft D so that the lever 105 is actuated in timed relation to the actuation of the pusher means 9.

Figure 9:
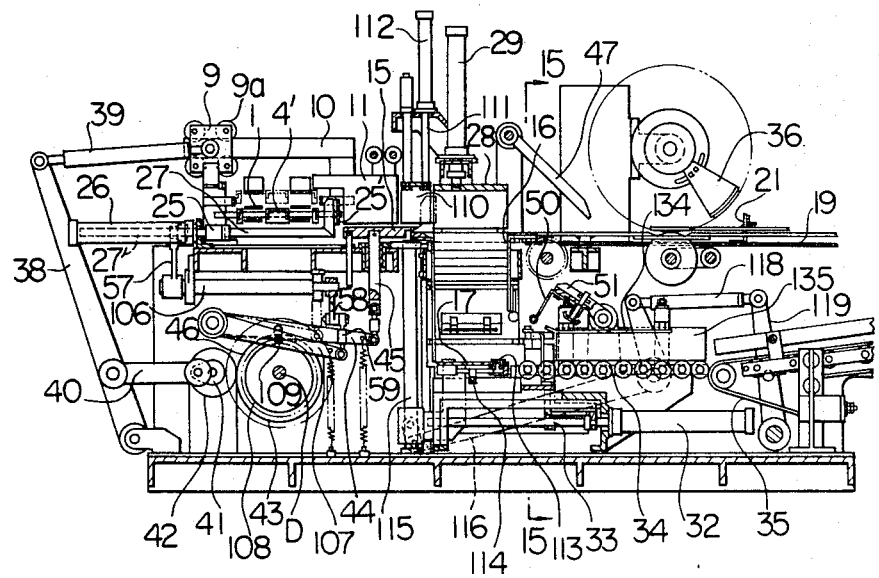
FIG. 9 is a fragmentary sectional view showing the construction of the apparatus of FIG. 6.
Figure 10:
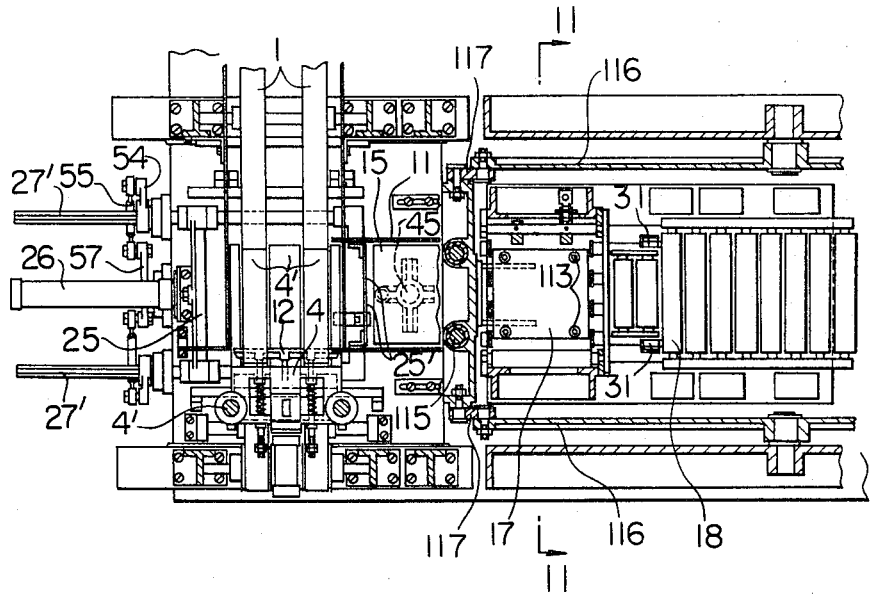
FIG. 10 is a plan view partly in section showing the construction of FIG. 9.

In FIG. 9, the lever 57 for actuating the pusher blades 25' is connected to the lever 58 through a shaft 106 and the lever 58 is actuated through the connecting rod 59 which is swingably connected to the outer end of an actuating lever 107 which is actuated by a cam 108 mounted on the driving shaft D through a roller 109 provided on the lever 107.

A pair of guide plates 110 for maintaining the articles *a* stacked on the table 15 are adapted to be lowered together with the descending movement of the table 15 through the rods 111 connected to the respective pistons actuated in the cylinders 112.

The supporting table 17 is shown as being provided with suction ports 113 opening in the upper surface of the table 17. The suction ports 113 are connected to a vacuum means (not shown) through tube means (not shown) so that the blank *b* is positively held in position on the table 17.

In the apparatus shown in FIG. 9, the table 17 is guided by a pair of parallel spaced vertical guide posts 115 and the table 17 is actuated by a pair of L-shaped levers 116 with their one ends connected to the table 17 through connecting rods 117 while the other ends are connected through adjustable connecting rods 118 to actuating levers 119 operatively coupled with the driving shaft D so that the table 17 is actuated in timed relation to the feeding of the blank *b* thereon as well as to the pusher means 31 for shifting the formed packaging box from the table 17.

In the apparatus shown in FIG. 9, the pusher means is actuated by the cylinder 32 which is located at a position opposite to that shown in FIG. 2. The operation of the cylinder 32, however, the same as that shown in FIG. 2.

Figure 11:
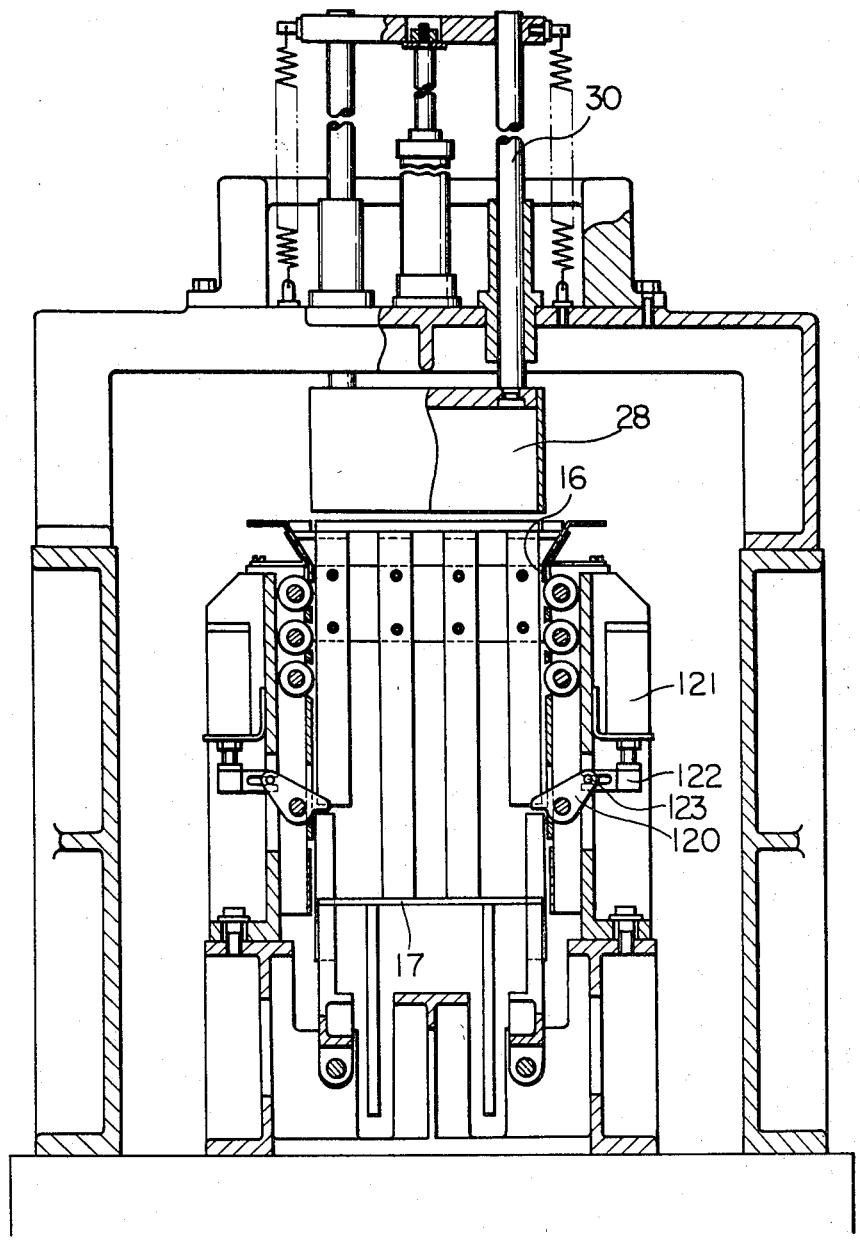
FIG. 11 is a cross-sectional view taken along line 11—11 in FIG. 10.

The latch members 120 shown in FIG. 11 serve to bend inwardly the upper edges of the side walls of the packaging box after it is formed in the female die 16, if it is desired to bend the upper edges. The latch members 120 are actuated by cylinders 121 through bifurcations 122 engaging with the pin 123 attached to the latch members 120.

Figure 12:
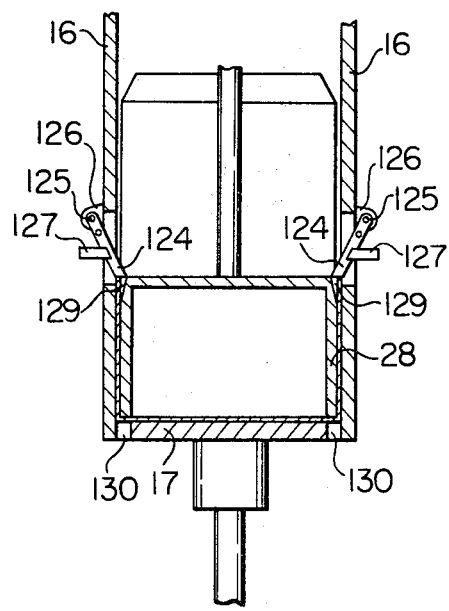
FIG. 12 is a cross-sectional view showing an example of the stopper means for holding the packaging box in position after it is formed.
Figure 13:
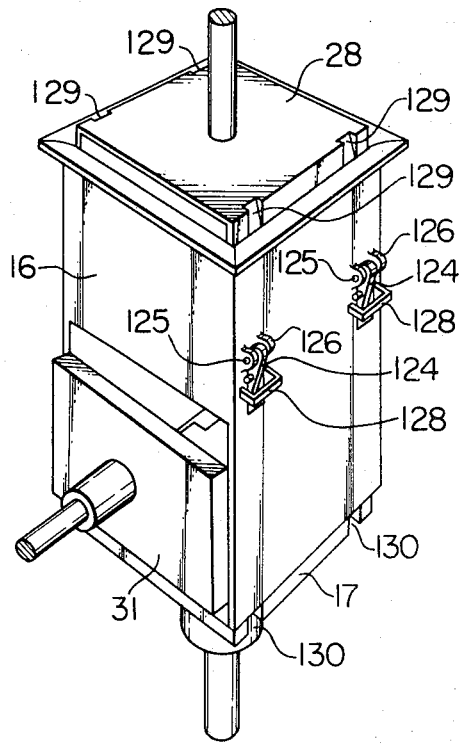
FIG. 13 is a perspective view of FIG. 12.
Figure 14:
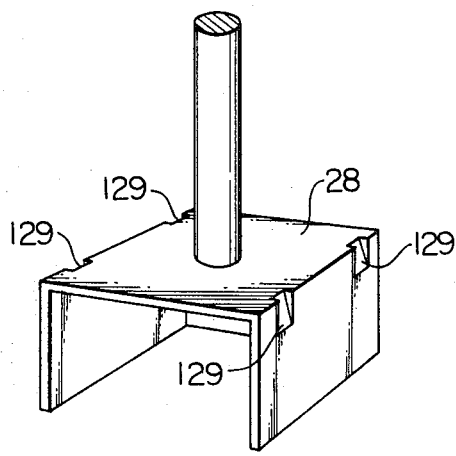
FIG. 14 is a fragmentary perspective view showing the notches formed in the male packaging box forming die cooperable with the stopper means of FIG. 12.

FIGS. 12 to 14 show a modification of the apparatus of FIG. 6. The embodiment shown in these figures is provided with means for positively preventing the formed packaging box from being raised together with the male die 28 as it is lifted. Since the clearance between the inner walls of the female die 16 and the outer walls of the male die 28 is rather small so that the exact shape of the packaging box is obtained from the blank *b* interposed between the male and female dies 28 and 16, the formed box tends to stick to the male die 28 when the male die 28 is lifted while the supporting table 17 are kept stationary so that the formed packaging box is moved upwardly as the male die 28 is lifted thereby resulting in a damage of the formed packaging box when the pusher means 31 is actuated. In order to prevent such a malfunction, stopper levers 124 are pivoted at 125 to the ears 126 provided on the side walls of the female die 16 as shown in FIGS. 12 and 13. The free ends of the levers 126 are normally urged beyond the inner wall of the female die 16 through holes formed in the side walls of the die 16 by means of springs 127 which are interposed between the levers 124 and U-shaped brackets 128 secured to the side walls of the die 16 around the levers 124.

Beveled notches 129 are formed in the side walls of the male die 28 at positions corresponding to the location of the levers 124 in the female die 16. In like manner, corresponding notches 130 are formed in the supporting table 17 as shown in FIGS. 12, 13.

Thus, when the supporting table 17 and the male die 28 are lowered through the female die 16 with the blank interposed therebetween, the levers 124 are urged outwardly against the action of the springs 127 so that they allow the passage of the table 17 and the male die 28 through the female die 16. After the male die 28 and the supporting table 17 reach their lowermost position, the levers 124 return to their inner positions so that the upper edges of the formed packaging box are arrested by the free ends of the levers 124 thereby permitting the male die 28 to be lifted without raising the formed packaging box.

The notches 129 allow the lifting of the male die 28 by virtue of the engagement of the inclined surfaces of the notches 129 with the free ends of the levers 124.

Similarly, the notches 130 of the table 17 allow the lifting of the table 17 through the female die 16 after the formed packaging box is shifted therefrom by means of the pusher means 31.

Figure 15:
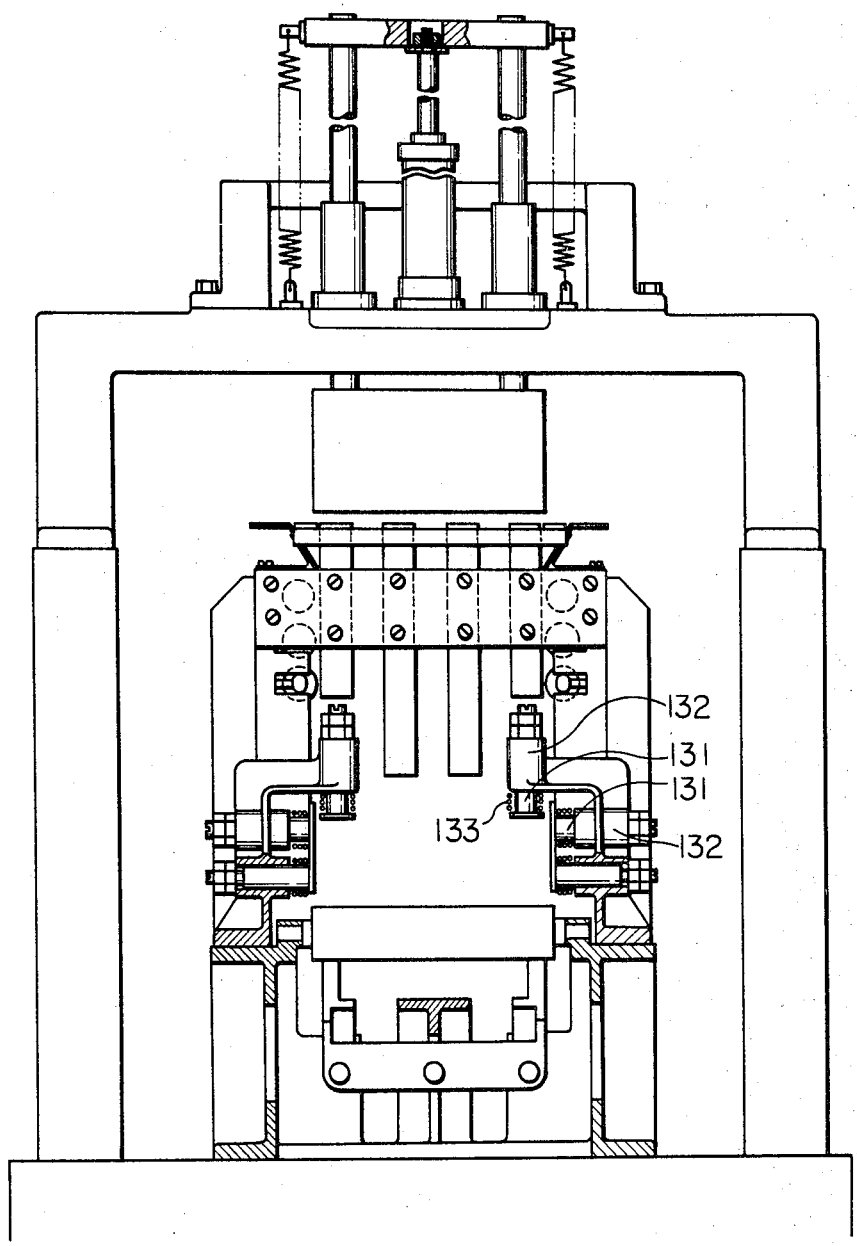
FIG. 15 is a cross-sectional view taken along line 15—15 in FIG. 9.
Figure 16:
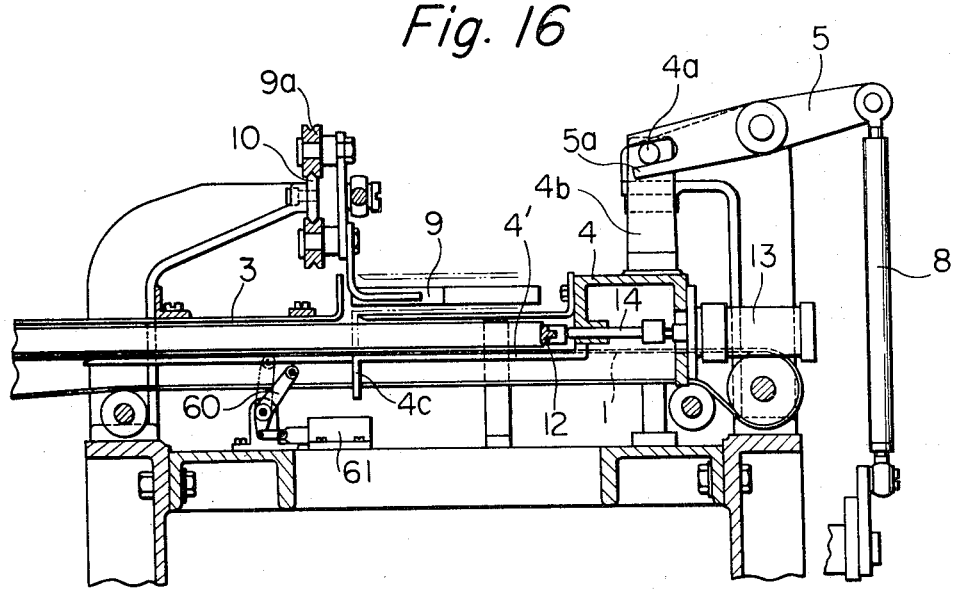
FIG. 16 is a fragmentary cross-sectional view showing the detail of the lifting and pusher means shown in FIG. 8.
Figure 17:
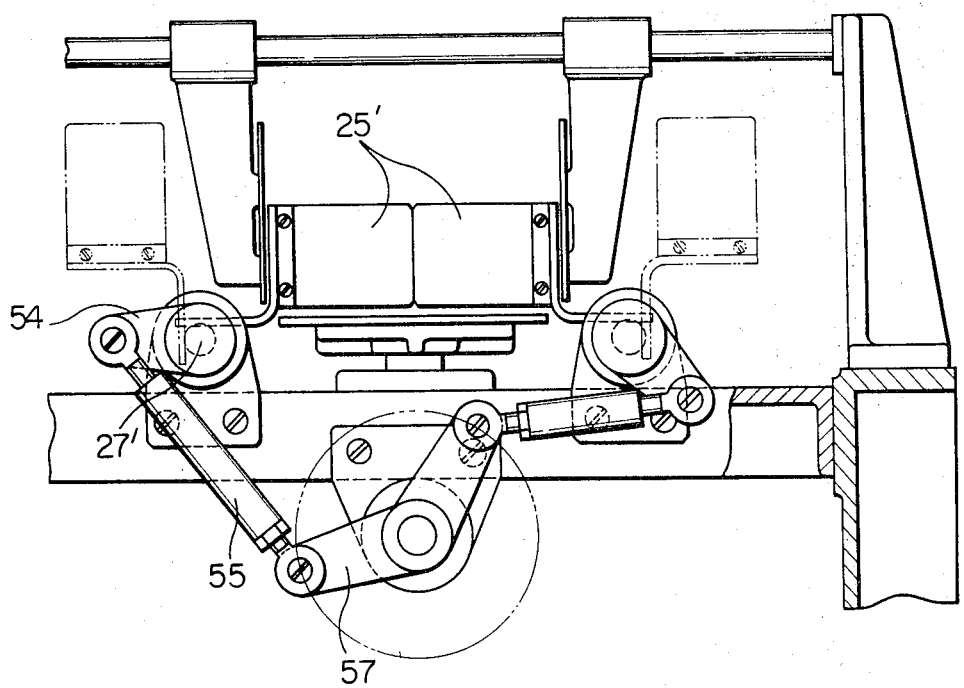
FIG. 17 is a fragmentary view showing the swinging means for swinging the pair of pusher plates incorporated in the apparatus of FIG. 6.

FIG. 15 shows the means for maintaining the shape of the formed packaging box after it is pushed out of the female die 16. The means is comprised of pusher bars 131 slidably supported by sleeves 132 and urged inwardly by means of springs 133 as shown in FIG. 15.

Figure 18:
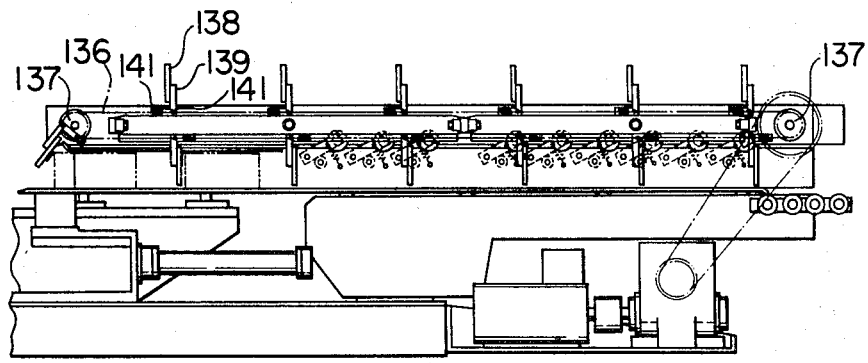
FIG. 18 is a side view showing the feeding means for feeding the formed packaging box from the apparatus of FIG. 6.

FIG. 18 shows the means for feeding formed packaging boxes individually so that the exact shape of each of the fed packaging boxes can be maintained while the lag of the lid portion of the packaging box is positively bonded to the mating side wall thereof.

In the apparatus shown in FIG. 9, each of the formed packaging boxes is fed by the succeeding packaging box between the passage defined by the conveyor 34 and the top guiding plate 134 and side guiding plates 135. This manner of feeding the formed packaging boxes has a danger that the formed packaging boxes might deform by virtue of the excessive pressure applied to the boxes which is required for feeding the boxes against the substantial frictional force given thereto by the guiding plates 134, 135.

In order to avoid the above disadvantages, the feeding means shown in FIG. 18 comprises a pair of endless chains 136 stretched around the sprockets 137 as shown. A plurality of pusher plates 138 are attached to the chains 136 by means of L-shaped brackets 139 at equal distance from each other. The brackets 139 are secured to the chains 136 by pins 140, 141 secured to the chains 136 which pass through two holes formed in the respective brackets 139, one of which is of an elongated hole so that the chains 136 can be driven around the sprockets 137 without being disturbed by the mounting of the brackets 139.

As shown in FIG. 18, each of the formed packaging box is advanced by the respective pusher plates 138 with the lug of the lid portion of the packaging box being urged against the side wall of the box thereby permitting the lug to be positively bonded to the side wall without causing any deformation in the packaging box.

Figure 19:
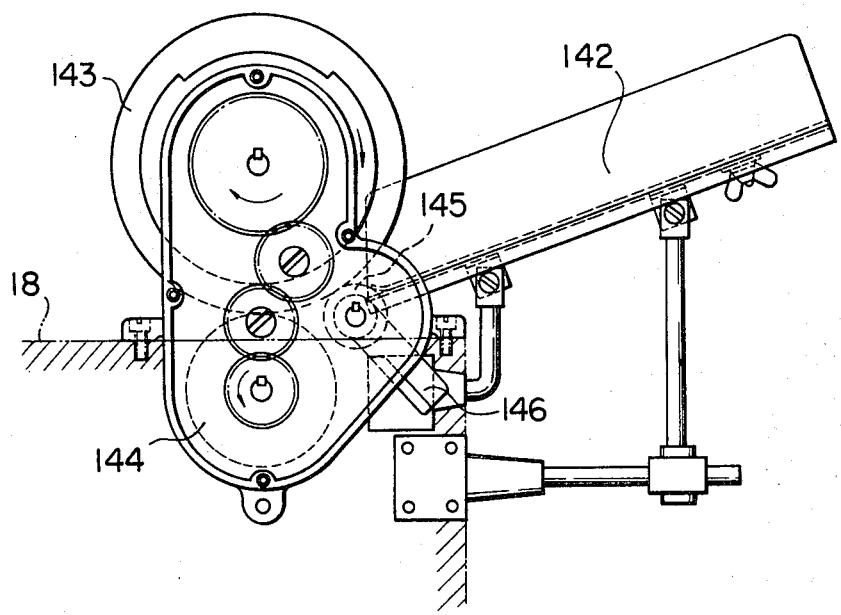
FIG. 19 is a view showing an example of feeding means of the blank of the packaging box incorporated in the apparatus of FIG. 6.

FIG. 19 shows the blank supply means provided in the apparatus shown in FIG. 6.

A plurality of blanks *b* are stacked on the chute 142 located in inclined position with respect to the guide table 18.

A pair of feed rollers 143, 144 are provided so as to feed successively the respective blanks *b* fed from the chute 142 and nipped therebetween. In order to feed each of the blanks *b* successively, a roller 145 is located in contact with the roller 143. The roller 145 is supported by a bracket 146. A portion of the peripheral surface of the roller 143 may be recessed so as to intermittently feed the blank *b* nipped between the rollers 143, 146.

Alternatively, the roller 146 is moved alternately in contact with and apart from the roller 143 in timed relation to the operation of the supporting table 17 by swinging the bracket 146 by means operatively coupled to the driving shaft D.

FIGS. 20 to 23 show the various sequential steps of forming the packaging box with the articles being packed therein simultaneously.

Figure 20:
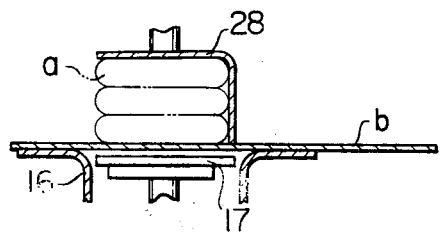
FIGS. 20 to 23 show the sequence how the blank is formed to a packaging box with the articles being packed therein simultaneously with the formation of the packaging box.
Figure 21:
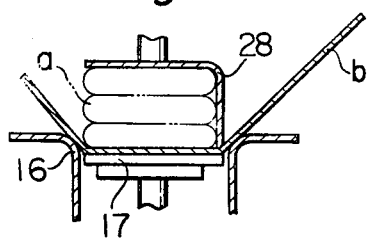
Figure 22:
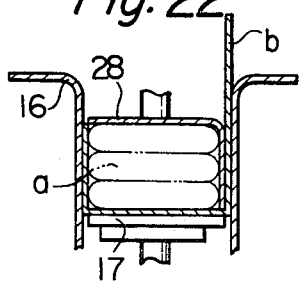
Figure 23:
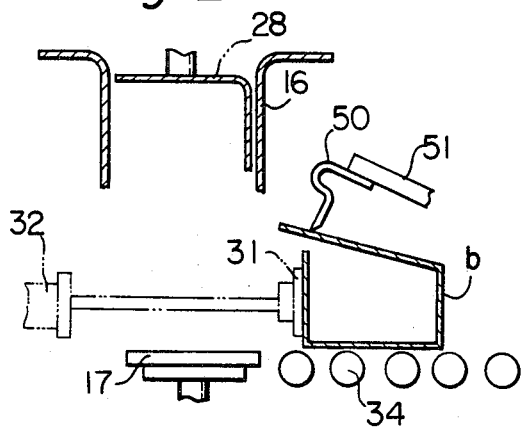

In FIG. 20, the blank *b* is placed on the table 17 with the articles *a* stacked thereon and the male die 28 is moved to contact with the blank *b*. In FIG. 21, the table 17 is lowered together with the die 28 through the female die 16 so that the blank *b* begins to be bent to form the packaging box. In FIG. 22, the formation of the packaging box is completed as the male die 28 is further lowered. In FIG. 23, the supporting table 17 reaches the lowermost position, the male die 28 is lifted from the table 17 and the packaging box is shifted on the conveyer 34 by the pusher means 31. The lug of the lid portion of the packaging box is shown to be bent by the pressing means 50 as previously described.

Figure 24:
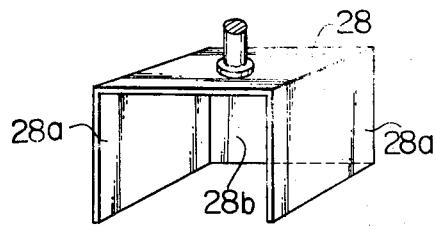
FIGS. 24 to 26 shows various examples of the construction of the male packaging box forming die to be incorporated in the apparatus of FIG. 6.
Figure 25:
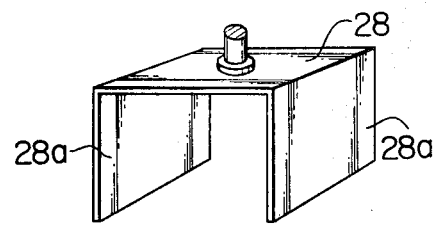
Figure 26:
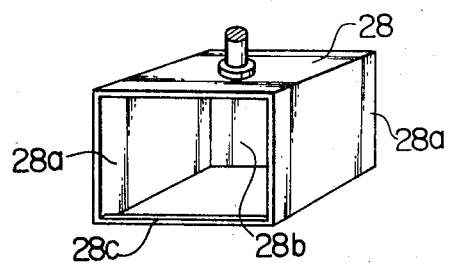

FIGS. 24 to 26 show the various preferred construction of the male die 28. The die 28 shown in FIG. 24 has three side walls 28*a*, 28*b* with the forward and lower sides open, while the side wall 28*b* is eliminated in the die 28 shown in FIG. 25.

The die 28 shown in FIG. 26 is similar to that shown in FIG. 24 except that a forword edge member 28*c* is provided in order to insure that the exact shape of the packaging box is obtained thereby.

Figure 27:
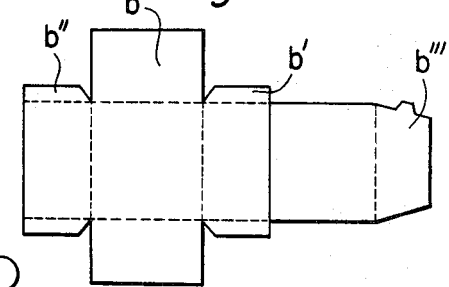
FIG. 27 shows an example of the blank of the packaging box.

FIG. 27 shows an example of the blank *b*. Lugs *b'*, *b''*, *b'''* are applied with the adhesive by the adhesive applying means 36 during the operation of the apparatus as previously described. If desired, the lid portion may be eliminated together with the lug *b'''*.

In the embodiments described above and shown in the drawings, the articles *a* are shown as being fed in a row on the conveyer, however, the articles *a* can be fed by the conveyer in more than one row thereon, or, alternatively, the predetermined number of the articles *a* can be fed in each of a plurality of buckets or compartments by transverse partitions provided on the conveyer within the scope of the present invention.

Further, within the scope of the present invention, the male die 28 may not necessarily be moved together with the supporting table 17 until it reaches the above described second position. It suffices to cooperate with the female die 16 so as to form the packaging box at the time the male die 28 enters the female die 16 and it can be returned to the initial position before the supporting table 17 reaches its second position insofar as the formed packaging box is moved together with the supporting table 17 by means such as suction ports 113 or the gravity of the articles packed in the packaging box.

I claim:

1. Process for automatically and successively forming packaging boxes and packing a predetermined number of articles therein simultaneously with the formation of each of said packaging boxes, wherein the improvement comprises the steps of feeding said articles my means of a conveyor with said articles arranged thereon in one or more rows in the direction of the feeding thereof by said conveyor, shifting said predetermined fraction of said predetermined number of said articles located foremost of said one or more rows out of said conveyor in the direction transverse to that of the feeding thereof by said conveyer to a predetermined position after temporarily stopping the feeding of said articles on said conveyer, repeatedly shifting the respective successive fractions of said predetermined number of said articles to said predetermined position as they are advanced by said conveyer and temporarily stopped while stepwise lowering successively each of the preceding fractions of said predetermined number of said articles shifted to said predetermined position in timed relation to the shifting of said predetermined fraction of said predetermined number of said articles by such a distance that each of the succeeding fractions of said predetermined number of said articles are stacked on the uppermost fraction of the precedingly stacked fractions of said predetermined number of said articles until said predetermined number of said articles are stacked at said predetermined position, shifting said predetermined number of said articles stacked at said predetermined position together to packaging box forming means, and simultaneously packing said articles in a packaging box while forming said packaging box from a blank in said packaging box forming means, the above described steps being repeated in a cyclic manner so that the automatic formation of the packaging boxes and the simultaneous packing of said predetermined number of said articles in each of said packaging boxes are effected successively.

2. Process according to claim 1, further comprising the step of raising said predetermined fraction of said predetermined number of said articles to a predetermined level by lifting means cooperable with said conveyer in timed relation prior to the shifting thereof transverse to the direction of the feeding by said conveyer, thereby permitting said raised fraction of said predetermined number of said articles to be shifted by pusher means adapted to be reciprocally moved transverse to the direction of the feeding by said conveyer at said predetermined level without disturbing the advance of the succeeding fractions of said predetermined number of said articles fed by said conveyer after said lifting means is lowered to its initial position, said lifting means being provided with stopping means to stop the advance of the succeeding articles on said conveyer each time said lifting means is raised to said predetermined level.

3. Process according to claim 1, wherein said predetermined fraction of said predetermined number of said articles on said conveyer is shifted transverse to the direction of the feeding by said conveyer directly therefrom by pusher means adapted to be repeatedly advanced transverse to the direction of the feeding by said conveyer immediately thereabove, said pusher means being lifted out of the path of the advance thereof during the return movement thereof to its initial position thereby permitting the succeeding fraction of said predetermined number of said articles on said conveyer to be advanced without being disturbed by the return movement of said pusher means.

4. Process according to claim 1, wherein the time period for temporarily stopping said articles on said conveyer is adjustable thereby permitting said predetermined fraction of said predetermined number of said articles to be varied.

5. Process for automatically and successively forming packaging boxes and packing a predetermined number of articles therein simultaneously with the formation of each of said packaging boxes, wherein the improvement comprises the steps of locating said predetermined number of said articles in stacked relation at a predetermined position, feeding a blank of said packaging box onto a supporting table movably located in an open ended female packaging box forming die adjacent to said predetermined position when said supporting table is located flush with the edges of said female packaging box forming die with said blank being registered with respect thereto, shifting said predetermined number of said articles located at said predetermined position onto said blank located on said supporting table, lowering a hollow male packaging box forming die into said female packaging box forming die together with said supporting table when said male packaging box forming die enters said female packaging box forming die with said predetermined number of said articles being located in said male packaging box forming die and with said blank located on said supporting table being clamped between said male packaging box forming die and said supporting table along the side edges of the bottom of said packaging box to be formed from said blank thereby permitting the side walls of said packaging box to be formed from said blank around said male packaging box forming die by the cooperation of said male and female packaging box forming dies when said male die enters said female die while said supporting table is moved beyond said open end of said female die with the thus formed packaging box packing said predetermined number of said articles therein being supported thereon, returning said male packaging box forming die to its initial position while said supporting table is kept stationary, removing said formed packaging box from said supporting table, and raising said supporting table to its initial position, the above described steps being repeated in a cyclic manner so that the automatic formation of the packaging boxes and the simultaneous packing of said predetermined number of said articles in each of said packaging boxes are effected successively.

6. Process according to claim 5, further comprising the step of applying an adhesive to either of the mating portions of said blank to be bonded together for forming the packaging box prior to the feeding and positioning thereof onto said supporting table thereby permitting the mating portions of said formed packaging box to be bonded together during the movement thereof in said female packaging box forming die to complete the formation of said formed packaging box.

7. Process according to claim 5, wherein said formed packaging box is provided with a lid portion with one side edge thereof being swingably connected to the upper edge of the forward side wall of said formed packaging box in the direction of the removing of said formed packaging box thereby permitting said lid portion to be bent by said open end of said female packaging box forming die so as to cover the formed packaging box when said formed packaging box is removed from said supporting table.

8. Process according to claim 7, further comprising the step of bonding the lug of said lid portion to the mating portion of said formed packaging box in timed relation to the removal of the same from said supporting table.

9. Process for automatically and successively forming packaging boxes and packing a predetermined number of articles therein simultaneously with the formation of each of said packaging boxes, wherein the improvement comprises the steps of feeding said articles by means of a conveyor with said articles arranged thereon in one or more rows in the direction of the feeding thereof by said conveyor, shifting said predetermined fraction of said predetermined number of said articles located foremost of said one or more rows out of said conveyor in the direction transverse to that of the feeding thereof by said conveyor to a predetermined position after temporarily stopping the feeding of said articles on said conveyor, repeatedly shifting the respective successive fractions of said predetermined number of said articles to said predetermined position as they are advanced by said conveyor and temporarily stopped while stepwise lowering successively each of the preceding fractions of said predetermined number of said articles shifted to said predetermined position in timed relation to the shifting of said predetermined fraction of said predetermined number of said articles by such a distance that each of the succeeding fractions of said predetermined number of said articles are stacked on the uppermost fraction of the precedingly stacked fractions of said predetermined number of said articles until said predetermined number of said articles are stacked at said predetermined position, feeding a blank of said packaging box onto a supporting table movably located in an open ended female packaging box forming die adjacent to said predetermined position when said supporting table is located flush with the edges of said female packaging box forming die with said blank being registered with respect thereto, shifting said predetermined number of said articles stacked at said predetermined position together onto said blank located on said supporting table, lowering a hollow male packaging box forming die into said female packaging box forming die together with said supporting table when said male packaging box forming die enters said female packaging box forming die with said predetermined number of said articles being located in said male packaging box forming die and with said blank located on said supporting table being clamped between said male packaging box forming die and said supporting table along the side edges of the bottom of said packaging box to be formed from said blank thereby permitting the side walls of said packaging box to be formed from said blank around said male packaging box forming die by the cooperation of said male and female packaging box forming dies when said male die enters said female die while said supporting table is moved beyond said open end of said female die with the thus formed packaging box packing therein said predetermined number of said articles being supported thereon, returning said male packaging box forming die to its initial position while said supporting table is kept stationary, removing said formed packaging box from said supporting table, and raising said supporting table to its initial position, the above described steps being repeated in a cyclic manner so that the automatic formation of the packaging boxes and the simultaneous packing of said predetermined number of said articles in each of said packaging boxes are effected successively.

10. Process according to claim 9, further comprising the step of raising said predetermined fraction of said predetermined number of said articles to a predetermined level by lifting means cooperable with said conveyer in timed relation prior to the shifting thereof transverse to the direction of the feeding by said conveyer, thereby permitting said raised fraction of said predetermined number of said articles to be shifted by pusher means adapted to be reciprocally moved transverse to the direction of the feeding by said conveyer at said predetermined level without disturbing the advance of the succeeding articles fed by said conveyer after said lifting means is lowered to its initial position, said lfting means being provided with stopping means to stop the advance of the succeeding articles on said conveyer each time said lifting means is raised to said predetermined level.

11. Process according to claim 9, wherein said predetermined fraction of said predetermined number of said articles on said conveyor is shifted transverse to the direction of the feeding by said conveyer directly therefrom by pusher means adapted to be repeatedly advanced transverse to the direction of the feeding by said conveyer immediately thereabove, said pusher means being lifted out of the path of the advance thereof during the return movement thereof to its initial position thereby permitting the succeeding articles on said conveyer to be advanced without being disturbed by the return movement of said pusher means.

12. Process according to claim 9, wherein the time period for temporarily stopping said articles on said conveyer is adjustable thereby permitting said predetermined fraction of said predetermined number of said articles to be varied.

13. Process according to claim 9, further comprising the step of applying an adhesive to either of the mating portions of said blank to be bonded together for forming the packaging box prior to the feeding and positioning thereof onto said supporting table thereby permitting the mating portions of said formed packaging box to be bonded together during the movement thereof in said female packaging box forming die to complete the formation of said formed packaging box.

14. Process according to claim 9, wherein said formed packaging box is provided with a lid portion with one side edge thereof being swingably connected to the upper edge of the forward side wall of said formed packaging box in the direction of the removing of said formed packaging box thereby permitting said lid portion to be bent by said open end of said female packaging box forming die so as to cover the formed packaging box when said formed packaging box is removed from said supporting table.

15. Process according to claim 14, further comprising the step of bonding the lug portion of said lid portion to the mating portion of said formed packaging box in timed relation to the removal of the same from said supporting table.

16. Apparatus for automatically and successively forming packaging boxes and packing a predetermined number of articles therein simultaneously with the formation of each of said packaging boxes, wherein the improvement comprises, in combination, conveyer means for feeding said articles with said articles arranged thereon in one or more rows in the direction of the feeding thereof by said conveyer means, means for temporarily stopping the feeding of said articles on said conveyor means, first pusher means for repeatedly shifting said predetermined fraction of said predetermined number of said articles located foremost of said one or more rows in the direction transverse to that of the feeding of said articles by said conveyer means onto a supporting table in timed relation to the temporary stopping of the feeding of said articles each time after the articles are advanced by said conveyer means, means for stepwise lowering said supporting table in timed relation after said predetermined fraction of said predetermined number of said articles have been shifted onto said supporting table by such a distance that the succeeding fraction of said predetermined number of said articles are stacked on the uppermost fraction of the precedingly stacked fractions of said predetermined number of said articles on said supporting table until said predetermined number of said articles are stacked on said supporting table and returning the same to its initial position, second pusher means for shifting said predetermined number of said articles stacked on said supporting table into packaging box forming means after said predetermined number of said articles have been stacked on said supporting table, said packaging box forming means being adapted to form successively packaging boxes from the blanks thereof in timed relation to the shifting of said predetermined number of said articles into said packaging box forming means, whereby permitting the automatic formation of the packaging boxes and the simultaneous packing of said predetermined number of said articles in each of said packaging boxes to be effected successively.

17. Apparatus according to claim 16, wherein said means for temporarily stopping the feeding of said articles is incorporated in a lifting means for raising said predetermined fraction of said predetermined number of said articles from said conveyer means to a predetermined level prior to the shifting thereof by means of said first pusher means, thereby permitting said first pusher means to be reciprocally moved at said predetermined level without disturbing the feeding of successive articles on said conveyer means after said lifting means is lowered to its initial position.

18. Apparatus according to claim 17, wherein said means for temporarily stopping the feeding of said articles is adjustable with respect to said lifting means thereby permitting said predetermined fraction of said predetermined number of said article to be varied.

19. Apparatus according to claim 17, wherein said lifting means is provided with stopping means for stopping the feeding of the successive articles on said conveyer means when said lifting means is raised to said predetermined level thereby preventing the damage of the articles when said lifting means is lowered to its initial position.

20. Apparatus according to claim 16, wherein further stopping means is provided beneath said conveyer means adjacent to the path of said first pusher means for temporarily stopping the feeding of the succeeding articles on said conveyer means in timed relation when said first pusher means is actuated to shift said predetermined fraction of said predetermined number of said articles from said conveyer means.

21. Apparatus according to claim 16, wherein a pair of stationary side walls are provided adjacent to the respective sides of said supporting table in parallel to the direction of the travel of said second pusher means so as to maintain the stacked positions of said articles on said supporting table, said second pusher means comprising a pair of oppositely swingable pusher plates swingably movable in a plane normal to the direction of the travel of said second pusher means, said pair of pusher plates being swung toward each other when said second pusher means is actuated to shift said stacked articles so that they move between said pair of stationary side walls so as to shift said stacked articles on said supporting table while said pair of pusher plates move outside of said pair of stationary side walls thereby permitting the actuation of said first pusher means to be effected without being disturbed by the return movement of said pair of pusher plates.

22. Apparatus for automatically and successively forming packaging boxes and packing a predetermined number of articles therein simultaneously with the formation of each of said packaging boxes, wherein the improvement comprises, in combination, means for feeding and positioning successively blanks of the packaging boxes onto a supporting table located in an open ended female packaging box forming die and movable therein from a first position flush with said female packaging box forming die therethrough to a second position beyond the open end of said female packaging box forming die and reversely to its first position, said blank being fed onto said supporting table when the same is positioned at said first position, a hollow male packaging box forming die adapted to move through said female packaging box forming die in fitting relation therewith from an initial position above said female packaging box forming die, first pusher means for shifting said predetermined number of said articles onto said blank located on said supporting table in timed relation to the feeding and positioning of said blank on said supporting table, first driving means for repeatedly moving said supporting table from its first position to said second position each time after said blank and said predetermined number of said articles are loaded thereon and returning said supporting table to said first position, second driving means for repeatedly moving said male packaging box forming die from said initial position into said female packaging box forming die in abutting relationship to said supporting table when said male die enters said female die so that said blank on said supporting table is clamped between said male packaging box forming die and said supporting table along the side edges of the bottom of the packaging box to be formed from said blank and said predetermined number of said articles are located within said male packaging box forming die thereby permitting the side walls of the packaging box to be formed around said male packaging box forming die from said blank by the cooperation of said male and female packaging box forming dies during the movement of said male packaging box forming die into said female packaging box forming die, said male packaging box forming die being returned to its initial position by said second driving means while said supporting table is kept stationary at its second position with said predetermined number of said articles being packed in the thus formed packaging box located on said supporting table, and second pusher means for shifting said formed packaging box out of said supporting table, said supporting table being returned to its first position by said first driving means after said formed packaging box is shifted from said supporting table by said second pusher means.

23. Apparatus according to claim 22, further comprising means for applying an adhesive to either of the mating portions of the blank to be bonded together for forming the packaging box prior to the feeding and positioning of said blank on said supporting table thereby permitting the mating portions of the formed packaging box to be bonded together while it is formed in said female packaging box forming die so as to complete the formation of the packaging box.

24. Apparatus according to claim 23, wherein said packaging box is provided with a lid portion with its one side edge swingably connected to the upper edge of the forward side wall of said formed packaging box in the direction of the shifting thereof by means of said second pusher means, said lid portion being bent to cover the formed packaging box by means of the open end of said female packaging box forming die when the same is shifted therefrom by means of said second pusher means, said apparatus being provided with means for bonding the lug portion of the lid portion with the adhesive applied thereon to the mating portion of the formed packaging box after the same is shifted from said female packaging box forming die.

25. Apparatus according to claim 22, wherein said supporting table is provided with vacuum means for sucking and holding said blank in position on said supporting table so that the blank is exactly shaped to form the packaging box.

26. Apparatus according to claim 22, wherein means is provided for preventing said formed packaging box from being lifted from said supporting table located in its second position while said male packaging box forming die is returned to its initial position thereby permitting said formed packaging box to be shifted by said second pusher means without harming said formed packaging box.

27. Apparatus for automatically and successively forming packaging boxes and packing a predetermined number of articles therein simultaneously with the formation of each of said packaging boxes, wherein the improvement comprises, in combination, conveyer means for feeding said articles with said articles arranged thereon in one or more rows in the direction of the feeding thereof by said conveyer means, means for temporarily stopping the feeding of said articles on said conveyer means, first pusher means for repeatedly shifting said predetermined fraction of said predetermined number of said articles located foremost of said one or more rows in a direction transverse to that of the feeding of said articles by said conveyer means onto a first supporting table in timed relation to the temporary stopping of the feeding of said articles each time after the articles are advanced by said conveyer means, means for stepwise lowering said first supporting table in timed relation after said predetermined fraction of said predetermined number of said articles have been shifted onto said first supporting table by such a distance that the succeeding fraction of said predetermined number of said articles are stacked on the uppermost fraction of the precedingly stacked fractions of said predetermined number of said articles on said first supporting table until said predetermined number of said articles are stacked on said first supporting table and returning the same to its initial position, means for feeding and positioning successively blanks of the packaging boxes onto a second supporting table located in an open ended female packaging box forming die located adjacent to the position to which said first supporting table is moved when it has been loaded thereon with said predetermined number of said articles, said second supporting table being movable in said female packaging box forming die from a first position flush with said female packaging box forming die therethrough to a second position beyond the open end of said female packaging box forming die and reversely to its first position, said blank being fed on said second supporting table when the same is positioned at said first position, a hollow male packaging box forming die adapted to move from an initial position above said female packaging box forming die in fitting relation therewith into said female packaging box forming die, second pusher means for shifting said predetermined number of said articles which have been stacked on said first supporting table onto said blank located on said second supporting table in timed relation to the feeding and positioning of said blank on said second supporting table, first driving means for repeatedly moving said second supporting table from its first position flush with said female packaging box forming die to its second position beyond said open end of said female packaging box forming die each time after said blank and said predetermined number of said articles are loaded thereon and returning said second supporting table to said first position, second driving means for repeatedly moving said male packaging box forming die from its initial position into said female die in abutting relationship to said supporting table when said male die enters said female die so that said blank on said second supporting table is clamped between said male packaging box forming die and said second supporting table along the side edges of the bottom of the packaging box to be formed from said blank and said predetermined number of said articles are located within said male packaging box forming die thereby permitting the side walls of the packaging box to be formed around said male packaging box forming die from said blank by the cooperation of said male and female packaging box forming dies during the movement of said male packaging box forming die into said female packaging box forming die said male packaging box forming die being returned to its initial position by said second driving means while said second supporting table is kept stationary at its second position with said predetermined number of said articles being packed in the thus formed packaging box located on said second supporting table, and third pusher means for shifting said formed packaging box out of said second supporting table, said second supporting table being returned to its first position by means of said first driving means after said formed packaging box is shifted from said second supporting table by said third pusher means.

28. Apparatus according to claim 27, wherein said means for temporarily stopping the feeding of said articles is incorporated in a lifting means for raising said predetermined fraction of said predetermined number of said articles from said conveyer means to a predetermined level prior to the shifting thereof by means of said first pusher means, thereby permitting said first pusher means to be reciprocally moved at said predetermined level without disturbing the feeding of successive articles on said conveyer means after said lifting means is lowered to its initial position.

29. Apparatus according to claim 28, wherein said means for temporarily stopping the feeding of said articles is adjustable with respect to said lifting means thereby permitting said predetermined fraction of said predetermined number of said article to be varied.

30. Apparatus according to claim 28, wherein said lifting means is provided with stopping means for stopping the feeding of the successive articles on said conveyor means when said lifting means is raised to said predetermined level thereby preventing the damage of the articles when said lifting means is lowered to its initial position.

31. Apparatus according to claim 27, wherein further stopping means is provided beneath said conveyor means adjacent to the path of said first pusher means for temporarily stopping the feeding of the succeeding articles on said conveyor means in timed relation when said first pusher means is actuated to shift said predetermined fraction of said predetermined number of said articles from said conveyor means.

32. Apparatus according to claim 27, wherein a pair of stationary side walls are provided adjacent to the respective sides of said first supporting table in parallel to the direction of the travel of said second pusher means so as to maintain the stacked positions of said articles on said first supporting table, said second pusher means comprising a pair of oppositely swingable pusher plates swingably movable in a plane normal to the direction of the travel of said second pusher means, said pair of pusher plates being swung toward each other when said second pusher means is actuated to shift said stacked articles so that they move between said pair of stationary side walls so as to shift said stacked articles on said first supporting table while said pair of pusher plates are swung away from each other during the return movement of said second pusher means to its initial position so that said pair of pusher plates move outside of said pair of stationary side walls thereby permitting the actuation of said first pusher means to be effected without being disturbed by the return movement of said pair of pusher plates.

33. Apparatus according to claim 27, further comprising means for applying an adhesive to either of the mating portions of the blank to be bonded together for forming the packaging box prior to the feeding and positioning of said blank on said second supporting table thereby permitting the mating portions of the formed packaging box to be bonded together while it is formed in said female packaging box forming die so as to complete the formation of the packaging box.

34. Apparatus according to claim 33, wherein said packaging box is provided with a lid portion with its one side edge swingably connected to the upper edge of the forward side wall of said formed packaging box in the direction of the shifting thereof by means of said third pusher means, said lid portion being bent to cover the formed packaging box by means of the open end of said female packaging box forming die when the same is shifted therefrom by means of said third pusher means, said apparatus being provided with means for bonding the lug of the lid portion with the adhesive applied thereon to the mating portion of the formed packaging box after the same is shifted from said female packaging box forming die.

35. Apparatus according to claim 27, wherein said second supporting table is provided with vacuum means for sucking and holding said blank in position on said second supporting table so that the blank is exactly shaped to form the packaging box.

36. Apparatus according to claim 27, wherein means is provided for preventing said formed packaging box from being lifted from said second supporting table located in its second position when said male packaging box forming die is returned from its second position to its initial position thereby permitting said formed packaging box to be shifted by said third pusher means without harming said formed packaging box.

References Cited

UNITED STATES PATENTS

| | | | |
|---|---|---|---|
| 3,046,712 | 7/1962 | Carter | 53—164 XR |
| 3,119,213 | 1/1964 | Kinney | 53—26 |
| 3,332,207 | 7/1967 | Midnight | 53—207 |
| 3,354,600 | 11/1967 | Hoffmann | 53—223 XR |

THERON E. CONDON, Primary Examiner

R. L. SPRUILL, Assistant Examiner

U.S. Cl. X.R.

53—32, 150, 162, 207, 223